# United States Patent  [11] 3,556,024

[72] Inventors William R. Fuller
 North Hollywood;
 Barrie H. Bieler, Walnut Creek; David C.
 Morgan, Clayton, Calif.
[21] Appl. No. 837,352
[22] Filed June 27, 1969
[45] Patented Jan. 19, 1971
[73] Assignee The Dow Chemical Company
 Midland, Mich.
 a corporation of Delaware

[54] METHOD OF REDUCING HALOGEN EMISSIONS FROM THE INCINERATION OF HALOGEN-CONTAINING PLASTICS
 7 Claims, No Drawings
[52] U.S. Cl....................................................... 110/1,
 110/8, 110/18
[51] Int. Cl........................................................ F23g 7/00

[50] Field of Search............................................ 110/1, 8, 18

[56] References Cited
 UNITED STATES PATENTS
 2,764,109 9/1956 Grosse........................... 110/1
 3,490,395 1/1970 Boyd et al..................... 110/18
 3,495,555 2/1970 Boyd et al..................... 110/8
Primary Examiner—Edward G. Favors
Attorneys—Griswold and Burdick, William R. Norris and Lloyd S. Jowanovitz ABSTRACT: The present invention is a method for reducing the amount of halogen emitted during the incineration of halogen-containing plastics. The method involves applying an alkali to the plastic before it is burned. The method can reduce the emission of halogen by greater than 75 percent when properly employed.

METHOD OF REDUCING HALOGEN EMISSIONS FROM THE INCINERATION OF HALOGEN-CONTAINING PLASTICS

BACKGROUND OF THE INVENTION

The use of halogen-containing plastics such as polychloroprene, polyvinyl chloride and polyvinylidene chloride has increased in recent years and is expected to increase at an accelerated rate in the future. One of the major advantages of these plastics is that they may be discarded and incinerated after use. It has been reported in the Jan. 27, 1968 issue of Chemical Week that the Battelle Memorial Institute estimates 0.5 percent of the municipal wastes in the United States to be halogen-containing plastics. This amount is expected to increase to over 1 percent by 1976. Most municipal wastes are burned in incinerators, with the combustion of the halogen-containing plastics resulting in the halogens being released, usually in the form of the hydrogen halide. Such combustion products are undesirable due to the air pollution and corrosion which they cause.

Attempts have been made to reduce the amount of halogen emission by passing the combustion gases of the halogen-containing plastic through screens loaded with solid sodium carbonate. These attempts have met with some success, however, such a method requires modification of the incinerator by the addition of special screens. The screens must be relieved of the sodium halide, which is the product of the reaction between the halogen and sodium carbonate, and reloaded with sodium carbonate periodically.

It is a principal object of the present invention to provide a method for reducing the emissions of halogen as a combustion product in the incineration of halogen-containing plastics.

An additional object is to provide such a method which may be practiced by applying the reactive agent directly to the material to be incinerated.

A further object is to provide such a method which may be practiced without the use of screens which must be loaded with a reactive agent and relieved of alkali metal halides on a periodic basis.

SUMMARY OF THE INVENTION

The present invention is a method for the reduction of halogen emissions in combustion products produced by the incineration of halogen-containing plastics. The method involves applying an alkali to the material to be incinerated.

DETAILED DESCRIPTION OF THE INVENTION

Conveniently, hydroxides of alkali metals or alkaline earth metals are used as the alkali. The alkali is normally applied by spraying it as a water solution on the waste to be incinerated. Therefore, those alkalis which are highly soluble in water are preferred. Those alkalis which are only slightly soluble in water are normally applied as particulate solids since their application as a solution would require excessive amounts of water. When the alkali is applied as a solid, a particle size of about 200 mesh is most effective.

Preferred alkalis for the practice of the present invention include hydroxides, oxides, carbonates and carboxylates such as acetates of the alkali metals and alkaline earth metals. The term carbonates is here intended to include bicarbonates, and oxide to include peroxide. The hydroxides and carbonates of sodium and calcium are especially effective for use as the alkali. Sodium hydroxide, i.e., caustic, is the preferred species of alkali for use in the present method due to its high solubility in water and low cost.

Sulfur containing alkalis such as the xanthates, sulfites or hydrosulfites of the alkali metals and alkaline earth metals may be used. However, separate facilities for the recovery of $SO_2$ from the flue gas should be provided when these substances are used.

When caustic is used as the alkali, contact with silicate brick commonly used in the manufacture of incinerators should be minimized in order to avoid corrosion of the brick. This is accomplished by applying the caustic to the waste material before placing it in the incinerator. When paper is included in the waste, as in the case in most large scale disposal operations. The caustic solution is absorbed by the paper thereby further reducing the possibility of contact between the solution and incinerator walls. The paper mixed with the plastic serves the additional function of keeping the alkali well dispersed. Dispersion of the alkali increases the effectiveness of the method.

The ratio of alkaline material to halogen is not critical. Halogen retention will occur at very low or very high loadings. Most efficient retention of the halogen is achieved when the mole ratio of alkali to the halogen is from about 0.4:1 to 1:1. At ratios of alkali to halogen of greater than about 1:1 retention increases, but the rate of increase is disproportionate to the increase in alkali to halogen ratio, thus reducing the efficiency of the method.

For maximum halogen retention, dispersion of the alkali material is important. Such dispersion is most readily accomplished by spraying a concentrated aqueous solution of the alkali on the matter to be burned.

The combination of the halogen-containing plastic in the presence of an alkali results in the formation of the halide of the metal constituent of the alkali. The metal halide thus formed may readily be removed from the incinerator along with the ash. The alkali employed should be selected from those containing alkali and alkaline earth metals which form halides having boiling points well above the burning temperature of the incinerator. The boiling points of sodium flouride, chloride and bromide are 1,705° C., 1,445° C. and 1,396° c., respectively. Sodium bases are acceptable for use as the alkali in incinerators which burn at below 1,396°. when bromine is to be retained, 1,445° C. when chlorine is the halogen and 1,705° C. when a fluorine containing plastic is to be incinerated. Other alkalis are useful only if the boiling points of the metal halides formed are above the temperature at which the incineration process is carried out.

The following examples will serve to further illustrate the invention:

EXAMPLE I

Weighed samples of powered polyvinyl chloride (PVC) were added to a platinum crucible. Weighed amounts of 50 percent caustic solution were then added and the crucibles heated to 750° C. in a gas fired pot furnace. The elevated temperature was maintained for 15 minutes. After heating, the residue was analyzed for chloride by silver precipitation. Percent chloride retention was computed as the amount of chloride retained in the residue over the amount of chlorine theoretically present in the polyvinyl chloride times 100. Table I indicates the results of six runs carried out as above described.

In runs 4 and 6, sufficient paper was added to raise the charge weight to about 20 grams to simulate large scale incineration operations in which paper makes up a major part of the waste.

EXAMPLE II

In a manner similar to that of example I, a 20.119 gm. sample of polyvinylidene chloride plastic film containing 66.32 percent chlorine was burned with 33 gm. of 50 percent caustic solution. The resulting residue was analyzed for chlorine and the chlorine retention was found to be 54.1 percent.

EXAMPLE III

In order to determine the efficiency of retention of chloride at varying ratios of caustic to the plastic used in example II, several runs were made wherein the mole ratio of caustic to chlorine varied from .1:1 to 2.5:1. in each case the sample of plastic film weighed 20 gm. which provided 13.26 gms. of chlorine.

TABLE I

| Run No. | Weight PVC, g. | Weight of chlorine in PVC, g. | Weight NaOH (50%), g. | Weight residue, g. | Percent chloride in residue | Weight of chlorine in residue, g. | Percent chloride retention |
|---|---|---|---|---|---|---|---|
| 1 | 20.057 | 14.5 | 36.3 | 24.6738 | 31.8 | 7.9 | 54.5 |
| 2 | 20.474 | 15.0 | 66.0 | 40.9025 | 23.34 | 9.55 | 63.8 |
| 3 | 20.473 | 15.0 | 33.0 | 23.6469 | 45.2 | 10.7 | 75.0 |
| 4 | 2.178 | 1.59 | 9.0 | 7.8129 | 15.2 | 1.18 | 74.00 |
| 5 | 20.228 | 14.6 | 66.0 | 44.2929 | 25.33 | 11.3 | 78.0 |
| 6 | 2.168 | 1.58 | 9.0 | 8.1009 | 15.42 | 1.25 | 79.0 |

NOTE.—The data of Table I indicates that, in general, as the ratio of caustic to chlorine increases, the percent retention increases. However, runs 1 and 3 do not follow this general rule. In run 1, the caustic was merely poured over the PVC particles. In run 3, the caustic and PVC were mixed mechanically. The difference in results, i.e., greater chloride retention was achieved in run 3 than in run 1 notwithstanding the fact that the caustic to chlorine ratio was greater in run 1, illustrate the desirability of thoroughly mixing the alkali with the plastic to be incinerated.

The results are tabulated in table II which illustrates that the efficiency of the method decreases as the mole ratio of caustic to chlorine exceeds about 1:1.

TABLE II

| | Mole ratio, Na to Cl | Theoretical percent retention | Actual* percent retention |
|---|---|---|---|
| Run No.: | | | |
| 1 | 0.07 | 7.0 | 8.0 |
| 2 | 0.15 | 15 | 16 |
| 3 | 0.30 | 30 | 29 |
| 4 | 0.60 | 60 | 61 |
| 5 | 0.90 | 90 | 76 |
| 6 | 1.20 | 100 | 82 |
| 7 | 2.0 | 100 | 86 |

*Accuracy is approximately ±1.

EXAMPLE IV:

A 20 gram sample of polyvinyl chloride was added to an 88 gram platinum crucible approximately 10 cm. across and 4 cm. deep. Forty grams of dry technical grade $Ca(OH)_2$ was added to the crucible and mixed with the polyvinyl chloride. The crucible, containing the $Ca(OH)_2$ and polyvinyl chloride was placed in a gas fired pot furnace and the temperature in the furnace slowly increased to 750°C. (±25°) over a 30 minute interval. The contents of the crucible were fired until there was no visible burning in the crucible. The residue in the crucible weighed 54.6 grams, 22 percent of which was determined to be chloride by silver precipitation. The percent chloride retention was determined to be 83 percent based on the weight of chloride retained and the weight of chloride present in the polyvinyl chloride starting material.

The emission of halogen from the combustion of halogen containing plastics may also be reduced by applying other alkalis such as Group I or Group II metal hydroxides, oxides, carbonates, carboxylates, xanthates, sulfites or hydrosulfites to the plastic to be burned.

We claim:

1. In the method of disposing of halogen-containing plastics by incineration, the improvement which comprises applying an alkali to the plastic before it is incinerated.

2. The method of claim 1 wherein the alkali is selected from the group consisting of alkali metal hydroxides, oxides, carbonates, carbonxylates, xanthates, sulfites and hydrosulfites.

3. The method of claim 1 wherein the alkali is selected from the group consisting of alkaline earth metal hydroxides, oxides, carbonates, carboxylates, xanthates, sulfites and hydrosulfites.

4. The method of claim 1 wherein the alkali is sodium hydroxide and it is applied to the plastic to be burned in the form of a water solution.

5. The method of claim 1 wherein the plastic is in admixture with waste paper.

6. The method of claim 4 wherein the sodium hydroxide is applied to the plastic in the form of a particulate solid.

7. The method of claim 6 wherein the size of the particles is approximately 200 mesh.